United States Patent [19]

Thompson et al.

[11] Patent Number: 4,968,748

[45] Date of Patent: Nov. 6, 1990

[54] THERMOPLASTIC BLEND OF POLYPHENYLENE ETHER POLYSTYRENE, HYDROGENATED BLOCK COPOLYMER POLYACRYLATE

[75] Inventors: Tracey L. Thompson, Vienna; Peter H. Thompson, Parkersburg, both of W. Va.

[73] Assignee: G E Chemicals, Inc., Parkersburg, W. Va.

[21] Appl. No.: 341,289

[22] Filed: Apr. 20, 1989

Related U.S. Application Data

[63] Continuation of Ser. No. 81,938, Aug. 5, 1987, abandoned.

[51] Int. Cl.$^5$ .............................................. C08L 71/12
[52] U.S. Cl. ...................................... 525/92; 525/905
[58] Field of Search ................................. 525/92, 905

[56] References Cited

U.S. PATENT DOCUMENTS

| | | | |
|---|---|---|---|
| 3,383,435 | 5/1968 | Cizek | 260/874 |
| 3,639,508 | 2/1972 | Kambour | 260/876 B |
| 3,660,531 | 5/1972 | Lauchlan et al. | 260/876 B |
| 3,787,532 | 1/1974 | Carmelite et al. | 260/876 R |
| 3,994,856 | 11/1976 | Katchman et al. | 260/876 B |
| 4,128,602 | 12/1978 | Ratehman et al. | 525/68 |
| 4,153,644 | 5/1979 | Sugio et al. | 525/92 |
| 4,167,507 | 9/1979 | Haaf | 525/92 |
| 4,423,189 | 12/1983 | Haaf | 525/95 |
| 4,544,703 | 10/1985 | Haaf | 525/92 |
| 4,695,594 | 9/1987 | Pressman | 521/92 |
| 4,728,675 | 3/1988 | Pressman | 521/92 |

FOREIGN PATENT DOCUMENTS

| | | |
|---|---|---|
| 3434973 | 3/1986 | Fed. Rep. of Germany . |
| 3434977 | 3/1986 | Fed. Rep. of Germany . |
| 3434978 | 3/1986 | Fed. Rep. of Germany . |
| 3434979 | 3/1986 | Fed. Rep. of Germany . |
| 2373583 | 8/1978 | France . |
| 1591137 | 6/1981 | United Kingdom . |

OTHER PUBLICATIONS

*Patent Abstracts of Japan*, vol. 7, No. 69 (C-158) (1214), dated Mar. 23, 1983 (of Japanese Reference No. 58-5356 dated Jan. 12, 1983).

*Primary Examiner*—Jacob Ziegler
*Attorney, Agent, or Firm*—Lowe, Price, LeBlanc, Becker & Shur

[57] ABSTRACT

The invention provides thermoplastic blends of a polyphenylene ether, a polystyrene, a substantially hydrogenated styrene-butadiene block copolymer, and a rubbery acrylate polymer; said blends may have improved thermal stability, gloss, color, and processability, heat distortion, and impact strength.

11 Claims, No Drawings

THERMOPLASTIC BLEND OF POLYPHENYLENE ETHER POLYSTYRENE, HYDROGENATED BLOCK COPOLYMER POLYACRYLATE

This application is a continuation of Application Ser. No. 07/081,938, filed Aug. 5, 1987, now abandoned.

BACKGROUND OF THE INVENTION

The present invention relates generally to novel thermoplastic compositions. More particularly the invention relates to novel resin blends of polyphenylene ethers, polystyrene, substantially hydrogenated block copolymers of vinyl aromatic compounds and conjugated dienes, and rubbery polyacrylates.

Polyphenylene ether (oxide) resins constitute an important family of linear thermoplastic engineering resins. These resins are generally polymers of 2,6-dimethylphenol and copolymers of 2,6-dimethylphenol with 2,3,6-trimethylphenol, and may be used alone or in blends with other polymers such as styrenic resins.

Polyphenylene ethers show good compatibility with styrenic polymers over a wide range of compositions, as shown for instance by Cizek, U.S. Pat. No. 3,383,435 (5/1968). It has further been shown by Kambour in U.S. Pat. No. 3,639,508 (1/1972), Lauchlan and Shaw in U.S. Pat. No. 3,660,531 (5/1972), Carmelite and Kramer in U.S. Pat. No. 3,787,532 (1.974), Katchman and Summers in U.S. Pat. No. 3,994,856 (11/1976) and Haaf in U.S. Pat. No. 4,167,507 (1/1979) that impact strength can be improved substantially by including elastomeric block polymers of a vinyl aromatic such as styrene and a conjugated diene such as butadiene, and/or grafts of polystyrene with styrene-butadiene copolymer elastomer. Such rubber modified polystyrenes are often called HIPS (high impact polystyrene). Blends of polyphenylene ethers with HIPS, with or without inclusion of the block polymer of styrene and butadiene, are useful for many applications, such as automotive and appliance components.

However, blends of polyphenylene ethers with HIPS often have several disadvantages. Long term aging at elevated temperatures may not be sufficient for many demanding uses. Gloss and color also may not be fully satisfactory to satisfy aesthetic requirements. In general, however, applications require that improvements in heat aging, gloss and color not be made at the sacrifice of impact strength, heat distortion, tensile strength, or processing rheology.

Blends of polyphenylene ethers with polystyrene and hydrogenated block copolymers of alkenyl aromatic compounds and conjugated dienes have been described by Haaf in U. S. Pat. No. 4,423,189 (12/1983). However, the polystyrene is of a relatively low molecular weight polystyrene, which may cause a substantial lowering of both heat distortion temperature and impact strength.

High impact strength, good processability, and thermal properties may be obtained by use of specially tailored graft polymers as blending agents, as described by BASF in German Patent Applications Nos. 3434973, 3434977, 3434978, and 3434979 (1968). These German applications use special monoalkenylaromatic/diene copolymers having a polyfunctional coupling center, X, defined in further detail therein. However, such blends require the manufacture or purchase of specially tailored materials, which may add significantly to the cost of the blend and increase the difficulty of adapting the composition to specific, specialized uses.

It is an object of the invention to derive blends with an excellent balance of impact strength, heat distortion temperature, color, gloss, tensile strength, tensile modulus, melt flow, and improved thermal stability. It is also an object of the invention to accomplish the abovecited objectives by mechanical blending of readily available and relatively inexpensive multipurpose polymers.

SUMMARY OF THE INVENTION

The discovery has been made that by blending (a) polyphenylene oxides with (b) a styrene resin, plus (c) a substantially hydrogenated block copolymer of a vinyl aromatic compound and a conjugated diene, plus (d) a rubbery polyacrylate, with (c) and (d) present in synergistic impact-improving amounts, an excellent balance of properties may be obtained. In particular, these new compositions may exhibit high thermal stability, gloss, color, and convenient melt flow which have hitherto been difficult to achieve simultaneously.

DETAILED DESCRIPTION OF THE INVENTION

The present invention is a thermoplastic composition which comprises a polyphenylene ether, a polystyrene, a substantially hydrogenated block copolymer which includes an alkenyl aromatic compound and a conjugated diene, and a rubbery polyacrylate.

The polyphenylene ethers are homopolymers or copolymers of monomers selected from 2,6-dialkylphenols and 2,3,6-trialkylphenols. Polymers of 2,6-dimethylphenol and copolymers thereof with a 2,3,6-trialkylphenol, such as 2,3,6-trimethylphenol, are preferred. Such polymers are available commercially or may be made by an oxidative process well known in the art and described, for instance, in U.S. Pat. No. 4,011,200. The most preferred copolymers are those comprising about 2 to about 20 wt% of 2,3,6-trimethylphenol and 98 to 80% 2,6-dimethylphenol.

The styrene resins useful in the composition of the invention are those having at least 25 percent by weight of the resin derived from vinyl aromatic monomers. Such vinyl aromatic monomers are known in the art and include monomers such as styrene, halogenated styrenes such as dibromostyrene, chlorostyrene and dichlorostyrene, and other ring and alpha substituted styrenes such as alpha-methyl styrene and vinyl toluene. Mixtures of different vinyl aromatic monomers may also be used. Styrene resins useful in the present invention are selected from the group consisting of homopolymers such as polystyrene, poly-alpha-methylstyrene, and polychlorostyrene, rubber modified polystyrenes (HIPS), copolymers of styrene with acrylic monomers such as acrylonitrile such as in styrene-acrylonitrile copolymers (SAN), and styrene-acrylonitrile-alpha-alkylstyrene copolymers, graft copolymers of styrene with or without other monomers, such as in styrene-acrylonitrile-butadiene graft copolymers (ABS), and copolymers of ethylvinylbenzene and divinylbenzene, and the like. Mixtures of different styrene resins may also be used. It is preferred, however, that the styrene resin component include at least 50 percent by weight homopolymer, and more preferably at least 75 percent by weight homopolymer. The homopolymer which is most preferred is a homopolymer of styrene.

In the preferred embodiment wherein the styrene resin is a polystyrene, the resin may have a weight-average molecular weight (mw) as high as about 500,000 and as low as about 1000. Polystyrenes of molecular weight substantially below 1000, such as those of 500 mw, may have excessively low viscosities and may be too plasticizing. Polystyrenes with molecular weights substantially above 500,000, such as 900,000 mw, may cause the composition to have inconveniently high viscosity, difficult processing, and may not mix adequately. Although polystyrenes in the range of 1000 to about 70,000 may be usable to achieve some of the objectives of the invention, such as processability, polystyrenes of about 1000 to about 70,000 mw may not have optimal heat distortion temperatures and impact strength. Polystyrenes of molecular weight above about 70,000 are preferred.

The substantially hydrogenated block copolymers of a vinyl aromatic compound and a conjugated diene are preferably the block copolymers of styrene and butadiene, for reasons of cost and ready commercial availability, but alternative monomers may be used to make workable compositions. For instance, other vinyl aromatics may be used, such as vinyltoluene, isopropylstyrene, t-butylstyrene, chlorostyrenes, and mono-,di or tribromostyrene. The diene may alternatively be isoprene or chlorobutadiene, for example. Mixtures of different dienes and mixtures of different vinyl aromatics may also be used. Such polymers may be made by means known in the art or are available from commercial sources, such as the "Kraton G" block copolymers manufactured by Shell Chemical Company.

The block copolymers are "substantially hydrogenated". This means that the ethylenic unsaturation of the original copolymer is reduced to about 10% or less of the original value by hydrogenation. Block copolymers having a substantially higher level of unsaturation, such as above 13 or 14%, may be deleterious to aging stability.

The rubbery polyacrylates useful in the composition of the invention are those polyacrylates commonly known as "acrylic elastomers". Typically, acrylic elastomers are polymers and copolymers of ethyl acrylate, butyl acrylate, 2-ethylhexyl acrylate, 2-ethylhexyl methacrylate and methoxyethyl acrylate, and may include lesser amounts of methyl methacrylate. By "rubbery" is meant that having elastic properties and a glass transition temperature below ambient temperatures, about 25° C. Methyl acrylate may be used as the monomer comprising the major portion of the acrylate polymer if ethylene is included in the polymer to reduce the glass transition temperature to below ambient temperature. As polymers containing methyl methacrylate are often glassy and not rubbery, methyl methacrylate containing polymers usually are not preferred. The preferred rubbery acrylate polymers are polymers of butyl acrylate, optionally with lesser amounts of another acrylic monomer such as methyl methacrylate. Such polymers are available commercially or may be made by means known in the art.

The block copolymer and the rubbery polyacrylate are present in the thermoplastic composition in amounts such that the composition exhibits greater impact strength in comparison to analogous blends which do not contain both the block copolymer and the polyacrylate. Usually such compositions will include about 20 to about 70 weight percent (preferably about 30 to about 60 weight percent) polyphenylene ether, about 70 to about 12 weight percent (preferably about 60 to about 20 weight percent) polystyrene homopolymer, about 2 to about 20 weight percent (preferably 4 to 10 weight percent) of the substantially hydrogenated block copolymer of vinyl aromatic and conjugated diene, and 2 to 20 weight percent (preferably 4 to 10 weight percent) of the rubbery polyacrylate. The preferred ranges usually give a better balance of impact strength, heat distortion temperature, and ease of processing.

The compositions of the invention may be prepared by any of a variety of methods well known in the art. For example, an intimate mixture of the components may be made by dry blending followed by extrusion and/or molding. Thermal processing in a melt mixing device such as a Banbury or Henschel mixer, a heated roll mill, or an extruder may be used to provide a resin blend which then may be chopped or ground into particles, optionally reextruded and repelletized or diced, and fed to an injection molding machine. Various combinations or sequences of these steps may be used, provided that thorough melt mixing is accomplished as complete and thorough mixing of the components is usually important to attaining good physical properties.

The blends may further comprise flame retardants, antioxidants, light stabilizers, pigments, dyes, fillers, plasticizers, mold release agents, impact modifiers, flow modifiers and other processing aids, reinforcing agents, and electrically conductive additives as well as other additives known in the art. Other resins may also be included, such as linear low density polyethylene. If additional components are present, it will be understood that the percent ranges of the four principal components of the compositions of the invention, as recited above, will be reduced proportionally as the other components contribute to the overall composition.

SPECIFIC EMBODIMENTS

The compositions of the invention will be better understood by consideration of the following examples, which are not offered in limitation of the invention but for purposes of illustration. All amounts stated in these examples are parts by weight. The test data given was determined by standard methods well known in the art of plastics testing. ASTM Methods used were as follows:

| Property | Method |
|---|---|
| Izod Impact | D-256 Method A |
| Heat Distortion Temp. (HDT) | D-648 |
| Melt Viscosity | D-3835 |
| Tensile Strength | D-638 |
| Tensile Modulus | D-638 |

Gloss was measured using a Gardner Gloss Meter. Percent Shrinkage was determined by heating a sample at 350° F. for two hours on a stainless steel pan covered with talc, and comparing the size of the treated sample to an' untreated sample of the same material.

The RTI value is the Relative Thermal Index, the temperature at which half the value of the specific property is lost in 100,000 hours, as measured from extrapolation of property loss data at higher temperatures. The property used for this measurement in the following examples was tensile impact. The color values were measured using a lightness index, L, measured by means of a photocell under artificial daylight, with the higher the number, the lighter the sample.

The following components were employed in the following examples, with the numbers in parenthesis below corresponding to the numbers indicated in parenthesis under the heading "Component" in the tables below:

(0). Polyphenylene ether (copolymer of 2,6-dimethylphenol and 2,3,6-trimethylphenol), obtained from Borg-Warner Chemicals, Inc.

(1). Polyphenylene ether (homopolymer of 2,6-dimethylphenol).

(2). Acrylic polymer, believed to be polybutyl acrylate copolymerized with a lesser amount of methyl methacrylate, obtained from Rohm & Haas.

(3). Saturated styrene-butadiene SBS block copolymer, wt. average molecular weight 74,000, obtained from Shell.

(4). Same as (3) but with a wt. average molecular weight of 174,000.

(5). Polystyrene, 200,000 wt. av. mw, obtained from Chevron. (6) Polystyrene, 215,000 wt. av. mw, obtained from Mobil. (7). Acrylic polymer, same monomers as (2) but different proportions, obtained from Rohm & Haas. (8). High impact polystyrene, available from Mobil. (9). Polystyrene, 290,000 wt. av. mw, obtained from Chevron. (11). Linear low density polyethylene, obtained from Union Carbide. (12). Styrene/butadiene block copolymer, obtained from Shell. (13). Ethylene/propylene copolymer, obtained from Exxon. (14). Aliphatic polyether.

EXAMPLE 1

In comparison to the prior art blends of polyphenylene with high impact polystyrene, various blends of polyphenylene ether with polyacrylates, polystyrene, and block copolymers of styrene and butadiene were evaluated. For comparison, a standard formulation of polyphenylene ether with high-impact polystyrene was included in the test series (formulation I). Mixing was done by dry blending followed by passage through an extruder. Test bars were molded from the blended plastic. The results are shown in the following table:

TABLE I

| Component | Formulation |  |  |  |  |  |  |
|---|---|---|---|---|---|---|---|
|  | A | B | F | G | H | I | J |
| PPE polymer (1) | 42 | 42 | 42 | 42 | 42 | 42 | 42 |
| R & H KM330 (2) | 8 | 8 | 8 | 8 | — | — | 8 |
| Kraton G-1650 (3) | 8 | — | 8 | — | 8 | 5 | 8 |
| Kraton G-1651 (4) | — | 8 | — | 8 | — | — | — |
| Chevron MC3700 (5) | 42 | 42 | — | — | 42 | — | — |
| Mobil 2524 (6) | — | — | 42 | 42 | — | — | — |
| R & H KM334 (7) | — | — | — | — | 8 | — | — |
| Mobil 4154 (8) | — | — | — | — | — | 53 | — |
| Chevron EA3000 (9) | — | — | — | — | — | — | 42 |
| Properties: |  |  |  |  |  |  |  |
| Izod Impact (ft. lb./in.) | 4.8 | 5.8 | 5.5 | 6.5 | 3.0 | 5.4 | 6.0 |
| HDT deg. F. ⅛" | 246 | 246 | 227 | 246 | 245 | 244 | 250 |
| Melt vis. (poise) @ 550° F., 500/sec | 3488 | 4399 | 3688 | 4555 | 3430 | 4134 | 4082 |
| Gloss @ 60° | 97 | 67 | 100 | 69 | 93 | 51 | 99 |
| % Shrinkage | 15 | 17.5 | 12.5 | 17.5 | 15 | 15 | 12.5 |
| Tensile strength psi | 8100 | 7820 | 8625 | 8055 | 8010 | 8350 | 8690 |
| Tensile modulus (× 100K psi) | 3.55 | 3.48 | 3.67 | 3.48 | 3.45 | 3.20 | 3.41 |

The low gloss of the standard formulation (I) is evident from the above data.

In experiments not exemplified above, substitution of 8 parts of styrene-butadiene block copolymers which were not hydrogenated, exemplified by Stereon 840A, Stereon 873, available from Firestone, or Finaprene 411 polymers available from Cosden, in place of the hydrogenated styrene-butadiene copolymers, gave blends with poor relative thermal index performance. In the case of Stereon 873, poor notched Izod impact also resulted. In the case of Stereon 840A and Finaprene 411, the comparative composition also had inconveniently high melt viscosity.

EXAMPLE 2

This example further shows the effect of the polyacrylate and the substantially hydrogenated styrene-butadiene block copolymer, added separately and in combination, in the polyphenylene ether/polystyrene blend. Formulation A is a comparative formulation. Formulation H is a formulation within the scope of the invention. Formulations B, F, and G are formulations omitting one component required by the invention. The compositions and obtained properties are shown in the following table:

TABLE II

| Component | Formulation |  |  |  |  |
|---|---|---|---|---|---|
|  | A | B | F | G | H |
| PPE polymer (0) | 40 | 40 | 40 | 40 | 41 |
| Mobil 4154 (8) | 55 | — | — | — | — |
| Chevron MC3700 (5) | — | 50 | 40 | 50 | 41 |
| R & H KM330 (2) | — | 10 | 20 | — | 10 |
| Kraton G-1650 (3) | 5 | — | — | — | 8 |
| R & H KM334 (7) | — | — | — | 10 | — |
| Properties: |  |  |  |  |  |
| Izod impact (ft. lb./in.) | 4.3 | 1.6 | 1.7 | 1.1 | 3.8 |
| HDT deg. F. ⅛" | 240 | 239 | 243 | 236 | 242 |

TABLE II-continued

| Component | Formulation | | | | |
|---|---|---|---|---|---|
| | A | B | F | G | H |
| Melt vis. (poise) @ 550° F., 500/sec. | 4431 | 3416 | 3915 | 3533 | 3798 |

The relatively high melt viscosity, which is adverse to processing convenience, for the prior art formulation (A) is evident in the foregoing table. Relatively poor Izod impact strength is evident for formulations B, F, and G which lack the hydrogenated styrene-butadiene block copolymer.

EXAMPLE 3

This example further shows the effect of the polyacrylate and the substantially hydrogenated styrene-butadiene block copolymer, added separately and in combination, in the polyphenylene ether/polystyrene blend. The compositions and properties obtained therefrom are shown in the following table:

The foregoing data show a benefit on impact strength from the combination of rubbery acrylate and hydrogenated block copolymer.

The data also show substantially higher gloss for the compositions of the invention than for the prior art composition, formulation A. Composition C of the invention as described in the foregoing table was compared regarding color (lightness) to the prior art formulation A in a standard lightness test under artificial daylight using a photometer; the lightness of formulation A was 67.62, the lightness of C was 78.19.

EXAMPLE 4

The effect of various levels and combinations of the components was demonstrated in this series of blends, reported below in Table IV.

TABLE III

| Component | Formulation | | | | | | |
|---|---|---|---|---|---|---|---|
| | A | B | C | D | E | F | G |
| PPE polymer (1) | 40 | 40 | 40 | 40 | 40 | 40 | 40 |
| Chevron MC3700 (5) | — | 40 | 40 | 40 | 40 | 40 | 40 |
| Mobil 4154 (8) | 55 | — | — | — | — | — | — |
| R & H KM330 (2) | — | 20 | 10 | — | 15 | 10 | 10 |
| Kraton G-1560 (3) | 5 | — | 10 | 20 | — | — | 5 |
| UCC 7042 (11) | — | — | — | — | 5 | 10 | 5 |
| Properties: | | | | | | | |
| Tensile strength (psi) | 7415 | 7447 | 6355 | 6020 | 7080 | 6670 | 6715 |
| Izod impact (ft. lb./in.) | 4.3 | 1.5 | 5.7 | 4.6 | 1.6 | 1.3 | 2.5 |
| % Shrinkage | 30 | 25 | 25.5 | 30 | 30 | 35 | 30 |
| HDT deg. F. ⅛" | 243 | 243 | 237 | 240 | 239 | 243 | 231 |
| Gloss @ 60 deg. | 57 | 88 | 99 | 102 | 97 | 98 | 100 |
| Melt vis. (poise) @ 550° F., 500/sec. | 4149 | 3510 | 3279 | 3239 | 3488 | 3376 | 3495 |

TABLE IV

| Component | Formulation | | | | | | | | | | |
|---|---|---|---|---|---|---|---|---|---|---|---|
| | A | B | C | D | E | F | G | H | I | J | K |
| PPE polymer (1) | 40 | 40 | 40 | 40 | 40 | 40 | 40 | 30 | 50 | 40 | 40 |
| Chevron MC3700 (5) | — | 40 | 40 | 40 | — | 50 | 44 | 54 | 34 | 44 | 44 |
| Chevron EA3000 (9) | — | — | — | — | 40 | — | — | — | — | — | — |
| Mobil 4154 (8) | 55 | — | — | — | — | — | — | — | — | — | — |
| R & H KM330 (2) | — | 10 | 20 | — | 10 | 5 | 8 | 8 | 8 | 10 | 6 |
| Kraton G-1560 (3) | 5 | 10 | — | 20 | 10 | 5 | 8 | 8 | 8 | 6 | 10 |
| Properties: | | | | | | | | | | | |
| Izod impact (ft. lb./in.) | 4.1 | 6.2 | 1.7 | 4.9 | 3.6 | 1.5 | 2.9 | 1.8 | 6.0 | 2.8 | 4.0 |
| Gloss @ 60 deg. | 61 | 97 | .96 | 103 | 98 | 102 | 102 | 102 | 100 | 101 | 103 |
| Tensile strength (psi) | 7370 | 6640 | 7590 | 6445 | 7530 | 8225 | 7240 | 6580 | 7515 | 7340 | 7130 |
| HDT deg. F. ⅛" | 235 | 243 | 245 | 240 | 249 | 231 | 235 | 219 | 264 | 243 | 244 |
| Melt vis. (poise) @ 550° F., 500/sec. | 4408 | 3446 | 3434 | 3297 | 4296 | 2759 | 3103 | 2241 | 4049 | 3154 | 3316 |
| Dynatup (ft. lb.) | 20.0 | 23.7 | 23.5 | 27.3 | 24.1 | 17.8 | 25.1 | 21.7 | 28.3 | 27.0 | 27.0 |
| standard dev. | 5.9 | 5.9 | 9.7 | 2.9 | 8.4 | 8.1 | 5.9 | 5.3 | 4.0 | 5.7 | 3.7 |

TABLE IV-continued

| Component | Formulation | | | | | | | | | | |
|---|---|---|---|---|---|---|---|---|---|---|---|
| | A | B | C | D | E | F | G | H | I | J | K |
| Tg (deg. C.) | 145 | 142 | — | — | 145 | — | 140 | — | — | — | — |

EXAMPLE 5

The relative thermal stabilities of a typical prior art formulation (A) and a composition of the present invention (B) were compared in the following experiment using the Underwriters Laboratory 746-B test method for thermal stability.

Test bars (1/16" thickness) were molded from the following two compositions, designated A and B.

TABLE V

| Component | Formulation | |
|---|---|---|
| | A | B |
| PPE polymer (1) | 42 | 42 |
| Mobil 4154 (8) | 53.5 | — |
| Chevron MC3700 (5) | — | 42 |
| Kraton D1101 (12) | 3.5 | — |
| Vistalon 719 (13) | 1.0 | — |
| R & H KM330 (2) | — | 8 |
| Kraton G-1650 (3) | — | 8 |
| Pluronic F-88 (14) | 0.5 | 0.5 |
| Trinonylphenyl phosphite (stabilizer) | 0.4 | 0.4 |
| Di-t-butyl-p-cresol (stabilizer) | 0.6 | 0.6 |
| Titanium Dioxide (pigment) | 4 | 4 |

The test bars were placed in a series of ovens at 120, 125, 130, 135, and 140C for 24 hours, and examined for tensile impact properties after these periods of time. The results were as follows:

TABLE VI

| Formulation | Time (hrs.) | Temperature (deg. C.) | | | | |
|---|---|---|---|---|---|---|
| | | 120 | 125 | 130 | 135 | 140 |
| A | 24 | 28.33 | 28.12 | 26.25 | 16.11 | 11.26 |
| A | 504 | 15.87 | 9.44 | 10.15 | 8.31 | 6.72 |
| B | 24 | 28.85 | 27.91 | 27.26 | 19.79 | 17.26 |
| B | 504 | 28.02 | 19.38 | 21.20 | 18.88 | 14.69 |

These data indicate the improved thermal aging performance of the composition of the invention, in comparison to a prior art formulation containing an unsaturated styrene/butadiene block copolymer.

EXAMPLE 6

The effect of the molecular weight of the polystyrene in compositions of the invention was evaluated by the following comparative tests. Formulations were as follows:

TABLE VII

| Component | Formulation | | |
|---|---|---|---|
| | A | B | C |
| PPE (1) | 42 | 42 | 42 |
| Chevron MC3700 (5) | 42 | — | — |
| Polystyrene 50,000 mw | — | 42 | — |
| Polystyrene 6,000 mw | — | — | 42 |
| Rohm & Haas KM330 (2) | 8 | 8 | 8 |
| Kraton G-1650 (3) | 8 | 8 | 8 |

Test bars of these compositions were subjected to tests for impact strength and heat distortion temperature. Results were as follows:

TABLE VIII

| Property | Formulation | | |
|---|---|---|---|
| | A | B | C |
| Izod impact (ft. lbs./in.) | 3.8 | 1.5 | 1.9 |
| Heat distortion temp. (deg. F.) | 240 | 210 | 195 |

These results indicate the benefit of using polystyrene of the preferred molecular weight range.

These examples have been presented to illustrate certain aspects of the present invention. The scope of the present invention is not limited to these above embodiments, but includes equivalent embodiments and modifications, and is defined by the following claims.

We claim:

1. A thermoplastic composition which comprises:
   (a) a polyphenylene ether;
   (b) a polystyrene homopolymer;
   (c) about 2 to about 20 wt. % of a substantially hydrogenated block copolymer of an alkenyl aromatic compound and a conjugated diene; and
   (d) about 2 to about 20 wt.% of a rubbery polyacrylate, said polyacrylate being formed from at least one acrylic estermonomer, said components (c) and (d) being present in synergistic impact strength improving amounts.

2. A thermoplastic composition which comprises:
   (a) about 20 to 70 wt% of a polyphenylene ether;
   (b) about 70 to about 12 wt% of a polystyrene homopolymer;
   (c) about 2 to about 20 wt% of a substantially hydrogenated block copolymer of an alkenyl aromatic compound and a conjugated diene; and
   (d) about 2 to about 20 wt% of a rubbery polyacrylate, said polyacrylate being formed from at least one acrylic ester monomer.

3. The composition of claim 2 in which the polyphenylene ether resin comprises a polymer of 2,6-dimethylphenol.

4. The composition of claim 2 in which the polyphenylene ether resin comprises a copolymer of 2,6-dimethylphenol and 2,3,6-trimethylphenol.

5. The composition of claim 2 in which the molecular weight of the polystyrene is about 70,000 to about 500,000.

6. The composition of claim 2 in which the substantially hydrogenated block copolymer is a copolymer of styrene and butadiene.

7. The composition of claim 2 wherein the substantially hydrogenated block copolymer is a substantially hydrogenated styrene-butadiene-styrene block copolymer.

8. The thermoplastic composition of claim 2, wherein said polyacrylate is formed from at least one monomer selected from the group consisting of methyl methacrylate, ethyl acrylate, butyl acrylate, 2-ethyl hexyl acrylate, 2-ethyl hexyl methacrylate, and methoxy ethyl acrylate, and optionally from a comonomer selected from the group consisting of ethylene and methyl methacrylate in a lesser amount, said at least one monomer being methyl methacrylate only when the comonomer is ethylene and the comonomer is present in an amount sufficient to afford the polyacrylate a glass transition temperature below ambient temperature.

9. The composition of claim 2 in which the rubbery polyacrylate is formed from butyl acrylate, copolymerized with a lesser amount of methyl methacrylate.

10. The composition of claim 2 wherein said composition comprises:
   (a) about 30 to about 60 wt% of a polyphenylene ether;
   (b) about 60 to about 20 wt% of a polystyrene homopolymer of weight average molecular weight of about 70,000 to about 500,000;
   (c) about 4 to about 10 wt% of a substantially hydrogenated block copolymer of styrene and butadiene; and
   (d) about 4 to 10 wt% of a rubbery copolymer formed from butyl acrylate, copolymerized with a lesser amount of methyl methacrylate.

11. A thermoplastic composition comprising:
   (a) about 20 to about 70 wt% of a polymer of 2,6-dimethylphenol;
   (b) about 70 to about 12 wt% of a polystyrene homopolymer having a weight average molecular weight of about 70,000 to about 500,000;
   (c) about 2 to about 20 wt% of a substantially hydrogenated block copolymer which includes styrene and butadiene; and
   (d) about 2 to about 20 wt% of a polymer formed from butyl acrylate, copolymerized with a lesser amount of methyl methacrylate.

* * * * *